(12) United States Patent
Zeng et al.

(10) Patent No.: US 9,599,699 B2
(45) Date of Patent: Mar. 21, 2017

(54) RSSI POSITIONING METHOD BASED ON FREQUENCY-HOPPING SPREAD SPECTRUM TECHNOLOGY

(71) Applicant: SHENYANG INSTITUTE OF AUTOMATION OF THE CHINESE ACADEMY OF SCIENCES, Liaoning (CN)

(72) Inventors: Peng Zeng, Liaoning (CN); Jinchao Xiao, Liaoning (CN); Jie He, Liaoning (CN); Haibin Yu, Liaoning (CN)

(73) Assignee: SHENYANG INSTITUTE OF AUTOMATION OF THE CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 14/909,244

(22) PCT Filed: Aug. 27, 2014

(86) PCT No.: PCT/CN2014/085237
§ 371 (c)(1),
(2) Date: Feb. 1, 2016

(87) PCT Pub. No.: WO2015/172458
PCT Pub. Date: Nov. 19, 2015

(65) Prior Publication Data
US 2016/0187460 A1  Jun. 30, 2016

(30) Foreign Application Priority Data

May 14, 2014 (CN) .......................... 2014 1 0204298

(51) Int. Cl.
*H04B 1/00* (2006.01)
*G01S 5/14* (2006.01)
(Continued)

(52) U.S. Cl.
CPC ................ *G01S 5/14* (2013.01); *G01S 1/042* (2013.01); *G01S 1/08* (2013.01); *G01S 5/021* (2013.01);
(Continued)

(58) Field of Classification Search
CPC ...... H04B 1/713; H04B 1/7156; H04B 1/715; H04B 2001/7154; H04B 1/7143;
(Continued)

(56) References Cited

U.S. PATENT DOCUMENTS 5,722,059 A * 2/1998 Campana, Jr. ..... G08B 21/0222
375/136
2004/0218664 A1  11/2004 Kennedy et al.
(Continued)

FOREIGN PATENT DOCUMENTS

CN  201035138 A  3/2008
CN  103033180 A  4/2013
(Continued)

OTHER PUBLICATIONS

Qiao, Fu et al. New Frequency Hopping Sequence Construction of Location Communication System under Mine Information and Control, vol. 37, No. 4, Aug. 2008 (Aug. 2008) ISSN: 1002-0411, pp. 472 to 475 (Chinese with English Abstract) (3 pages).
(Continued)

*Primary Examiner* — Zewdu Kassa
(74) *Attorney, Agent, or Firm* — Smith, Gambrell & Russell, LLP

(57) ABSTRACT

An RSSI positioning method based on frequency-hopping spread spectrum technology, comprising: calibration stage: measuring the RSSI values of a plurality of channels at fixed points, and recording and calculating the ranging parameters in an RSSI ranging model; system preparation: deploying a positioning anchor node, and realizing synchronization
(Continued)

between a target node and the anchor node; conducting communication on the target node by respectively utilizing a plurality of channels to obtain the RSSI values; signal processing stage: processing the RSSI into signal strength amplitude and performing optimization; and positioning stage: calculating a distance and the target node position on a positioning server according to each of the signal strength. The present invention solves the problem that low RSSI positioning precision cannot satisfy the actual requirements because a traditional RSSI positioning method is limited to factors such as multipath signal transmission, co-channel interference, obstacle interference and low coordinate calculation precision of a trilateration method.

9 Claims, 3 Drawing Sheets

(51) Int. Cl.
G01S 5/02 (2010.01)
H04B 1/713 (2011.01)
G01S 1/04 (2006.01)
G01S 1/08 (2006.01)
G01S 11/02 (2010.01)
G01S 11/06 (2006.01)

(52) U.S. Cl.
CPC ........... *G01S 5/0226* (2013.01); *G01S 5/0252* (2013.01); *G01S 11/02* (2013.01); *G01S 11/06* (2013.01); *H04B 1/713* (2013.01)

(58) Field of Classification Search
CPC ........ H04B 1/707; H04B 1/69; H04B 1/7075; H04J 13/10; H04J 13/00; H04L 1/0003; H04L 1/0071; H04L 5/0007; H04L 1/0009; H04L 27/0008; H04L 27/2647; H04N 5/4401
USPC ................ 375/133, 132, 130, 295, 316, 219
See application file for complete search history.

(56) References Cited

U.S. PATENT DOCUMENTS

| | | |
|---|---|---|
| 2004/0252752 A1 | 12/2004 | Kennedy et al. |
| 2005/0058182 A1 | 3/2005 | Kennedy et al. |
| 2006/0066157 A1* | 3/2006 | Narayanan ............. H02K 17/16 310/54 |
| 2008/0200184 A1 | 8/2008 | Kennedy et al. |
| 2009/0286548 A1* | 11/2009 | Coronel .................. H04W 4/20 455/456.1 |
| 2013/0196684 A1 | 8/2013 | Dong et al. |

FOREIGN PATENT DOCUMENTS

| | | | |
|---|---|---|---|
| CN | 103228040 A | 7/2013 | |
| DE | 102013200618 | 8/2013 | |
| GB | 2499889 A | 9/2013 | |
| JP | EP 1022578 A2 * | 7/2000 | ............. G01C 21/30 |

OTHER PUBLICATIONS

International Search Report for PCT/CN2014/085237, dated Feb. 27, 2015 in English & Chinese Language.

* cited by examiner

RSSI POSITIONING METHOD BASED ON FREQUENCY-HOPPING SPREAD SPECTRUM TECHNOLOGY

TECHNICAL FIELD

The present invention relates to the field of wireless positioning, in particular to an RSSI (Received Signal Strength Indication) positioning method based on frequency-hopping spread spectrum technology.

BACKGROUND

There are many localization algorithms which can be divided into range-based localization algorithms and range-free localization algorithms according to whether there is a need to measure the distances of actual nodes in a positioning process. The range-based localization scheme is a method to estimate the positions of the nodes by measuring the distance or angle information between the nodes through the triangle and centroid location algorithm, a trilateration localization method, a least square method or a maximum likelihood estimation, etc. The existing common ranging technology includes TOA (time of arrival), TDOA (time difference of arrival), AOA (angel of arrival) and RSSI (Received Signal Strength Indication), etc. The range-free localization algorithm is a method to complete the estimation of the positions of the nodes without measuring the distance or angle information between the nodes only according to the information of network connectivity, etc. The common method includes: a centroid localization algorithm, an Amorphous algorithm, a DV-Hop algorithm, an APIT algorithm, etc. Compared with such range-based localization algorithms as TOA, TDOA, AOA, etc., the trilateration localization method based on RSSI does not need additional hardware overhead and has the advantages of low realization complexity, low hardware resource overhead, etc.

With the continuous development of informationization technology, people's need for positioning and navigation technologies is increasingly grown. The wireless range-based localization method has a significant status in the positioning technology and plays an increasing pole in the fields of military affairs, sailing, etc. Wherein, the ranging based on Received Signal Strength Indication (RSSI)—and the trilateration localization method are representative realization solutions. RSSI is used to estimate the distance between two communication nodes through received signal strength so as to realize positioning. Because its positioning principle is simple and RSSI values can be obtained to realize positioning without additional hardware overhead, RSSI is becoming a research hotspot of the wireless positioning technology. However, the ranging error is large because the RSSI values are affected by the multipath effect in actual ranging, resulting in an influence on the position accuracy. The trilateration localization method is constrained by the ranging accuracy, so the precision of the position coordinate is further affected. Thus, it is necessary and meaningful to research how to increase the RSSI ranging positioning accuracy and improve the positioning algorithm.

At present, there are two major aspects about the research of RSSI ranging precision. One aspect is to use the RSSI value of a single channel given by communication chips to conduct a large number of actual environmental tests and to conduct averaging, Gaussian model fitting, differential operation, etc. according to a fading channel model to reduce the ranging error. The other aspect is to give an improvement on the RSSI algorithm. Some reduce transient interference and noise interference by screening strange signals through FIR and ITR filtering, some propose an algorithm for weighting the RSSI value and some introduce the maximum likelihood estimation into the positioning of the "constant-logarithm" model. However, these methods fail to consider the influence of the multipath effect.

Because increasing wireless technologies use ISM frequency band, it is very easy to suffer co-channel interference for communication in this frequency band.

As a result, it is urgent to provide a method for reducing co-channel interference, obstacle blocking and multipath effect response with respect to the problem of—positioning precision based on RSSI.

The frequency-hopping spread spectrum (FHSS) technology is a novel wireless technology that appears in recent years. It builds on multi-channel communication and prevents random interference and multipath effect from affecting communication reliability by continuously changing the channels. In the FHSS process, the channel through which each packet of two wireless devices is sent is different from the channel through which the previous packet is sent. Such technology is used earliest in the IEEE802.15.1 protocol (Bluetooth). In Bluetooth cluster, a device that wants to communicate with the head of the cluster shall be keep time synchronized with the head of the cluster first; and then, Hash algorithm is used to map the address of the head of the cluster into an FHSS sequence. All the nodes will comply with this FHSS sequence to switch the channels for 1600 times/minute. IEEE802.15.4 also uses the FHSS technology. In the 2.4 GHz frequency band, IEEE802.15.4 uses 16 channels to conduct FHSS and specifies that the switching time between the channels is less than 192 μs.

SUMMARY OF THE PRESENT INVENTION

The purposes of the present invention are to overcome the defects in the prior art and to provide an RSSI positioning method based on frequency-hopping spread spectrum technology so as to reduce the influences of multi-channel communication with co-channel interference, obstacle blocking and multipath effect on the positioning accuracy and increase the coordinate calculating precision while adopting an MinMax positioning algorithm.

To realize the above-mentioned purposes, the present invention discloses the technical solution: an RSSI positioning method based on frequency-hopping spread spectrum technology comprising the following steps:

Step 1, calibration stage: measuring RSSI values of a plurality of channels at fixed points, and recording and calculating a ranging parameter in an RSSI ranging model;

Step 2, system preparation: deploying a wireless sensor network and realizing synchronization between a target node and an anchor node in the wireless sensor network;

Step 3, the target node communicating with the anchor node by respectively utilizing a plurality of channels, thereby obtaining the RSSI values; the anchor node eliminating the channels with relatively large RSSI value error from an FHSS sequence according to the received position signal strength of the sending node in one FHSS cycle; updating the FHSS sequence and adding the channels to a blacklist;

Step 4, signal processing stage: processing the RSSI values into signal strength amplitudes and performing optimization; and Step 5, positioning stage: calculating a distance value between the target node and the anchor node on a positioning server according to each of the signal strength amplitudes, and calculating the position coordinate of the target node.

Said RSSI ranging model is a "constant-logarithm" model:

$$A = RSSI(d) + 10 * n * \lg(d)$$

wherein, A is signal received power at a distance of 1 m, n is a propagation factor, d is a distance between the target node and the anchor node, A and n are ranging parameters.

The ranging parameters in said RSSI ranging model are determined through repeated multi-channel communication experiments, comprising the following steps:

calculating the measured values of A and n by measuring RSSI values of two sets of different d position; and averaging the obtained A and n as the values of A and n by repeated multi-channel communication measurements.

Said wireless sensor network is a multi-channel TDMA mesh network with time synchronization and comprising anchor nodes, target nodes, a positioning server and a network path auxiliary device.

Said RSSI values are processed into signal strength amplitudes and optimized, comprising the following steps:

converting the signal strength values RSSI into the signal amplitudes:

$$A_i = k * (10^{RSSI_i})^{0.5}$$

wherein $A_i$ is a signal amplitude, k is a constant coefficient, i is a channel label, and $RSSI_i$ is a measured signal strength value of the ith channel;

calculating the central values $A_0$ of the signal amplitudes $A_i$ repeatedly and converting $A_0$ into RSSI value, i.e., an optimized RSSI value; and calculating the distance value between the target node and the anchor node according to the optimized RSSI value.

The calculation method of the central value $A_0$ of the signal amplitude is:

$$A_0 = A_1 l \sqrt{1 + \frac{l^2}{l^2 + (2h)^2} + 2 \frac{l}{\sqrt{l^2 + (2h)^2}} \cos\left(\frac{2\pi\left(\sqrt{l^2 + (2h)^2} - l\right)}{\lambda}\right)}$$

wherein l is the distance between the positioning anchor node and the target node, h is the height from the anchor node to the ground, and λ is the wavelength of a radio frequency signal.

Because calculating position occurs on a single chip microcomputer which calculation capability is weak; for solving the approximate value of $A_0$, a special solution manner can be used to finish it; and the maximum $A_{max}$ and the minimum $A_{min}$ of $A_i$ are obtained to perform approximate calculation of the central value of the signal amplitude:

$$A_0 = \frac{A_{max} + A_{min}}{2}$$

The approximate calculation method of the central value $A_0$ of the signal amplitude is:

the maximum $A_{max}$ and the minimum $A_{min}$ of $A_i$ are obtained to perform approximate calculation of the central value of the signal amplitude $A_i$:

$$A_0 = \frac{A_{max} + A_{min}}{2}$$

The optimized RSSI value is calculated by using the central value $A_0$ of the signal amplitude, specifically:

$$RSSI = 2 * \log_{10}(A/k)$$

wherein k is a constant coefficient.

The calculation of the distance value between the target node and the anchor node is specifically:

the central value $A_0$ of the signal amplitude is substituted into the formula $$d = 10^{\left(\frac{A - RSSI(d)}{10n}\right)}$$

to calculate the distance value d.

The calculation of the position coordinate of the target node on the positioning server according to each of the signal strength and the distance value is specifically:

The calculated distance between the anchor node and the target node is d; then, a square is drawn by using 2d as width and using the anchor node as the central point; the target node is within the overlapping region of the squares of all beacon nodes around the target node.

The coordinate of the anchor node is $(x_m, y_m)$; the RSSI value received by the anchor node is used for calculating the estimated distance $d_m$ away from an unknown node; a square is drawn by using $2*d_m$ as side length and using $(x_m, y_m)$ as the center, so the coordinates of four vertexes of the square are:

$$(x_a - d_a, y_a - d_a) \times (x_a + d_a, y_a + d_a);$$

It can be known by analogy that the coordinates of the vertexes of the other anchor nodes are:

$$(x_i - d_i, y_i - d_i) \times (x_i + d_i, y_i + d_i)$$

The coordinates of four vertexes of the final overlapping region of the squares are:

$$[\max(x_i - d_i), \max(y_i - d_i)] \times [\min(x_i - d_i), \min(y_i - d_i)]$$

Then, the estimated position of the target node is the central position of the overlapping region, with the coordinate as:

$$[(\max(x_i - d_i) + \min(x_i + d_i))/2, (\max(y_i - d_i) + \min(y_i + d_i))/2]$$

The present invention has the following advantages and beneficial effects:

1. The FHSS technology is introduced; the influences of random interference and multipath effect on communication reliability are avoided by continuously changing the channels; an RSSI values with higher reliability are screened out; compared with various range-based localization methods by directly obtaining RSSI, this technology obviously increases the positioning precision.

2. The time of the screening process of the RSSI values can be effectively reduced and the system availability can be increased by using an FHSS mode with channel cognitive blacklist.

3. The MinMax positioning algorithm is introduced for calculating the positioning coordinate, so as to effectively inhibit inaccurate calculation of the positioning coordinate due to an increase in a ranging error, thereby increasing the precision of the positioning coordinate.

DETAILED DESCRIPTION OF THE EMBODIMENTS

The present invention will be further described in detail below in combination with the drawings and the embodiments.

Figure 1:
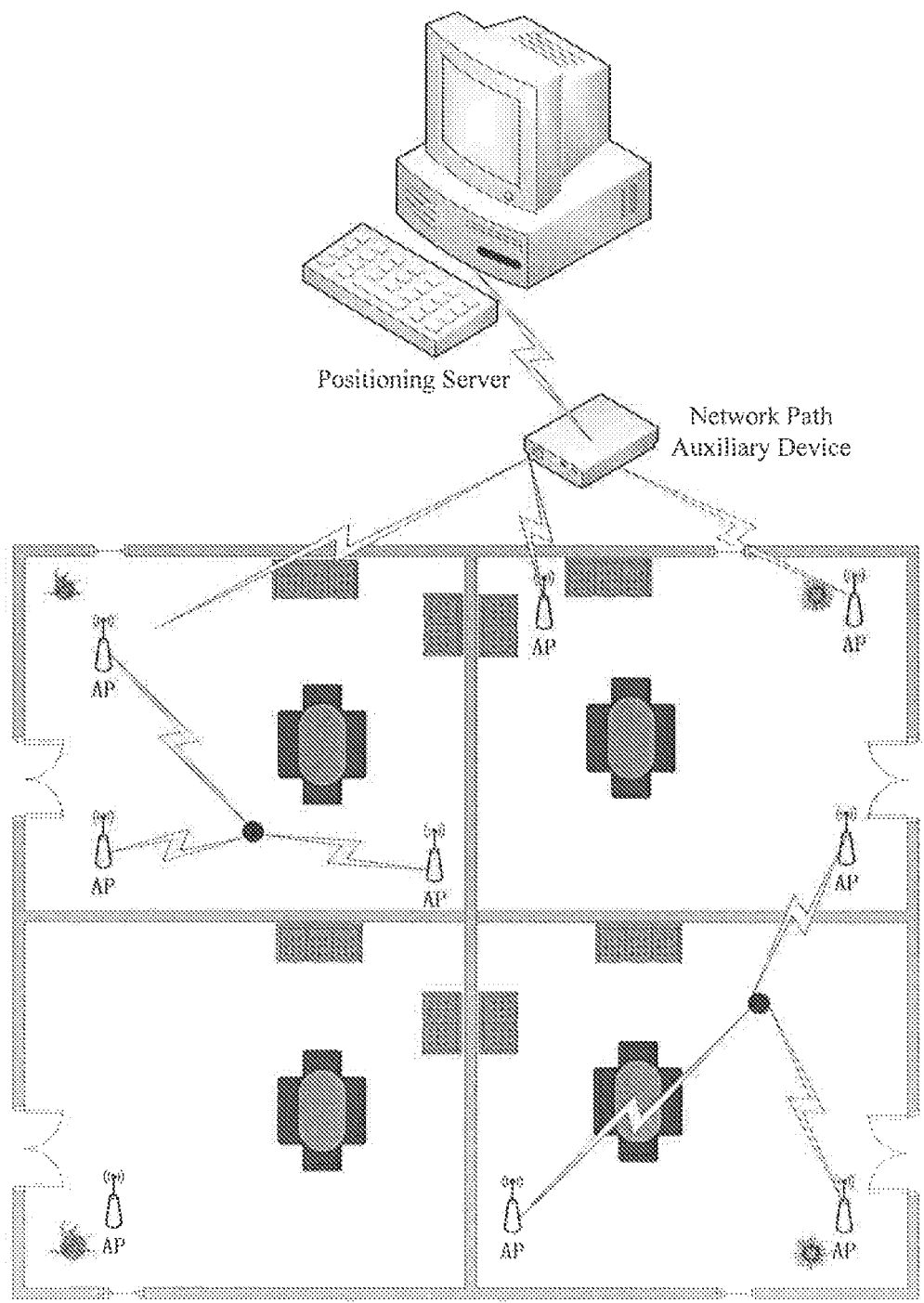
FIG. 1 is a structural diagram of basic composition of a positioning system of the present invention.

As shown in FIG. 1, the anchor node AP represents a reference node in a known position, a solid circle represents the target node, and a lightning symbol represents a wireless communications link. The system essentially comprises: (1) three and more anchor nodes, wherein the position information of each anchor node is known; the anchor nodes have wireless receiving and transmitting function and the layout directions of receiving antennas are consistent. (2) The target node to be measured has wireless transmitting function and has consistent transmitting frequency and communication protocol with the anchor nodes and the layout directions of receiving antennas are consistent. (3) The system at least includes one gateway mainly used for collecting RSSI informations of the target node transmitted by each anchor node and reporting the collected data to the positioning server. (4) The positioning server calculates the position informations of the target node through special software.

Figure 2:
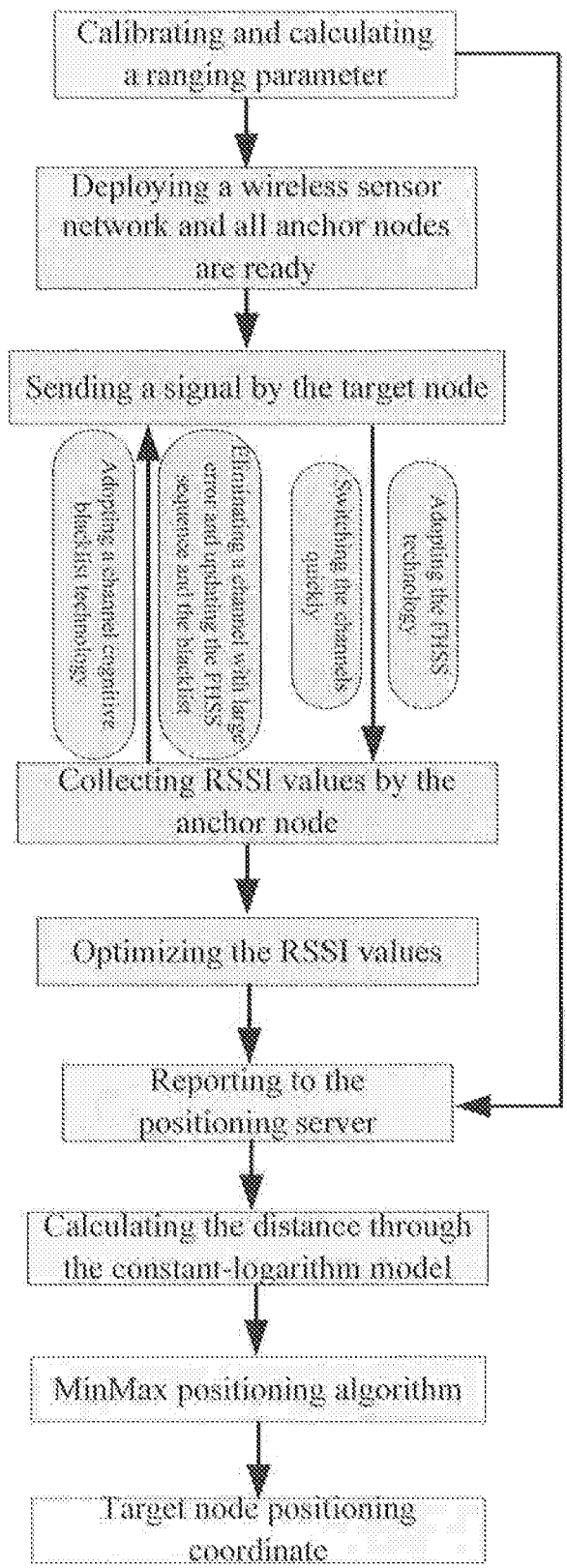
FIG. 2 is a flow chart of a positioning algorithm of the present invention.
Figure 3:
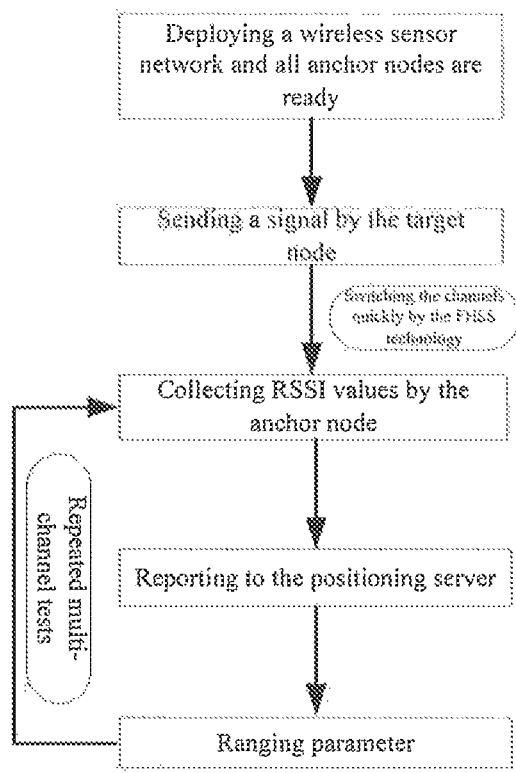
FIG. 3 is a flow chart for obtaining ranging parameters of the present invention.

The specific workflow is shown in FIG. 2:

Step 1, calibration stage: measuring RSSI values of a plurality of channels at fixed points, and recording and calculating the ranging parameters in an RSSI ranging model, as shown in FIG. 3:

The RSSI ranging model adopted in the present invention is a "constant-logarithm" model:

$$A = RSSI(d) + 10 * n * \lg(d)$$

wherein A and n are ranging parameters. The values of A and n can be calculated by measuring RSSI values of two sets of different d position. In the present invention, the values of A and n are calculated by selecting measured values at shorter transmission distances of 1 m and 3 m. The obtained A and n are averaged by repeated multi-channel communication experiments for reducing the random error;

Step 2, system preparation: deploying a wireless sensor network and realizing synchronization between the target node and the anchor node;

Step 3, the target node communicating with the positioning anchor node by respectively utilizing a plurality of channels to obtain the RSSI values; by adopting an automatic FHSS technology, the receiving node (i.e., the anchor node) eliminating a channel with larger RSSI value error in an FHSS sequence according to the position signal strength of a sending node received within one FHSS cycle through a channel cognitive blacklist technology; and updating the FHSS sequence and a blacklist;

Step 4, signal processing stage: processing RSSI into a signal strength amplitude and performing optimization;

The present invention adopts an indirect mode for calculating the central value of the signal amplitude, as follows:

converting the signal strength value RSSI into a signal amplitude:

$$A_i = k * (10^{RSSI_i})^{0.5}$$

wherein k is a constant coefficient, i is a channel label, and RSSI is a measured signal strength value;

calculating the central value $A_0$ of repeated signal amplitude result $A_i$ and converting $A_0$ into RSSI value, i.e., an optimized RSSI value; and calculating the distance d according to the optimized RSSI value.

The calculation method of the central value $A_0$ of the signal amplitude is:

$$A_0 = A_1 l \sqrt{1 + \frac{l^2}{l^2 + (2h)^2} + 2 \frac{l}{\sqrt{l^2 + (2h)^2}} \cos\left(\frac{2\pi\left(\sqrt{l^2 + (2h)^2} - l\right)}{\lambda}\right)}$$

wherein l is the distance between the positioning anchor node and the target node, h is the height from the anchor node to the ground, and λ is the wavelength of a radio frequency signal.

Because positioning calculation occurs on a single chip microcomputer which calculation capability is weak; for solving the approximate value of $A_0$ a special solution manner can be used to finish it; and the maximum $A_{max}$ and the minimum $A_{min}$ of $A_i$ are obtained to perform approximate calculation of the central value of the signal amplitude:

$$A_0 = \frac{A_{max} + A_{min}}{2}$$

The optimized RSSI value is calculated by using the central value $A_0$ of the signal amplitude, specifically:

$$RSSI = 2 * \log_{10}(A/k)$$

wherein k is a constant coefficient.

The distance is calculated according to the optimized RSSI value and the ranging parameters, specifically:

the central value $A_0$ of the signal amplitude is substituted into the formula $$d = 10^{\left(\frac{A - RSSI(d)}{10n}\right)}$$

to calculate the measured distance value.

There are many advantages using this method for calculation: 1. noise generated by multipath reflection caused by environmental factors such as heights of the positioning anchor node and the target node, signal frequency, etc. is included, enhancing the adaptability to different environments; 2. the calculation of an overdetermined equation of the central value is avoided, reducing calculation complexity; 3. the central value method is used, effectively inhibiting noise spots from appearing and preventing a single datum that is off-center excessively from affecting the accuracy of a final result.

Step 5, positioning stage: calculating the position coordinate of the target node on a positioning server according to each of the signal strength and the distance value.

MinMax positioning algorithm is specifically:

The calculated distance between the anchor node and the target node is d; then, a square is drawn by using 2d as width and using the anchor node as the central point; the target node is within the overlapping region of the squares of all beacon nodes around the target node.

Figure 4:
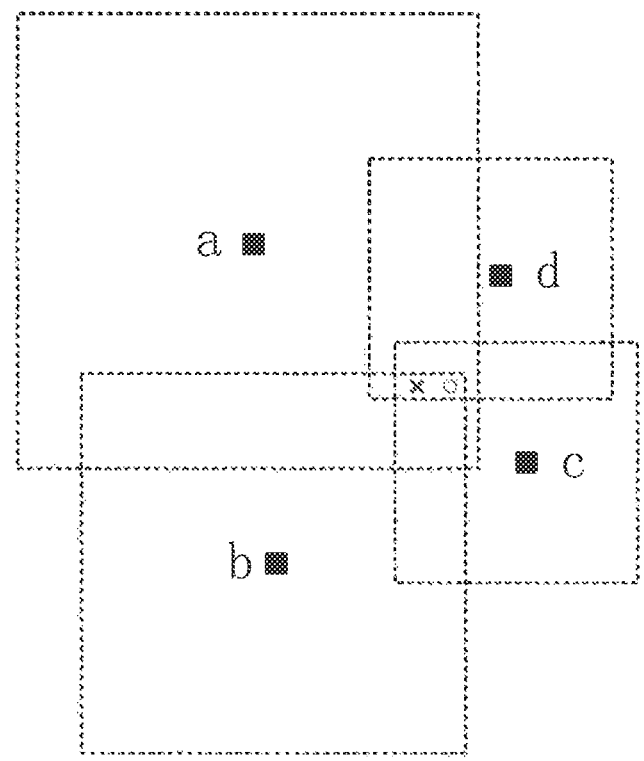
FIG. 4 is a schematic diagram of MinMax positioning method of the present invention.

As shown in FIG. 4, the anchor node a is taken as an example, and the coordinate of a is $(x_a, y_a)$; the RSSI value received at node a is used for calculating the estimated distance $d_a$ away from an unknown node; a squares is drawn by using $2*d_a$ as side length and using $(x_a, y_a)$ as the center, so the coordinates of four vertexes of the square are:

$$(x_a-d_a, y_a-d_a) \times (x_a+d_a, y_a+d_a)$$

It can be known by analogy that the coordinates of the vertexes of the other anchor nodes are:

$$(x_i-d_i, y_i-d_i) \times (x_i+d_i, y_i+d_i)$$

The coordinates of four vertexes of the final overlapping region of the squares are:

$$[\max(x_i-d_i), \max(y_i-d_i)] \times [\min(x_i-d_i), \min(y_i-d_i)]$$

Then, the estimated position of the target node is the central position of the overlapping region, and the coordinate thereof can be calculated according to the coordinates of four vertexes.

$$[(\max(x_i-d_i)+\min(x_i+d_i))/2, (\max(y_i-d_i)+\min(y_i+d_i))/2]$$

We claim:

1. An RSSI positioning method based on frequency-hopping spread spectrum technology, comprising:
   measuring RSSI values of a plurality of channels at fixed points, and recording and calculating at least one ranging parameter in an RSSI ranging model;
   deploying a wireless sensor network and synchronizing between a target node and a plurality of anchor nodes in the wireless sensor network;
   communicating with the plurality of anchor nodes, via the target node, by respectively utilizing a plurality of channels, thereby obtaining the RSSI values; the plurality of anchor nodes eliminating the channels with relatively large RSSI value error from a frequency-hopping spread spectrum (FHSS) sequence according to the received position signal strength of the sending node in one FHSS cycle; and updating the FHSS sequence and adding the eliminated channels to a blacklist;
   processing the RSSI values into signal strength amplitudes and performing optimization; and
   calculating, for each anchor node in the plurality of anchor nodes, a distance value between the target node and the respective anchor node on a positioning server according to each of the signal strength amplitudes, and calculating the position coordinate of the target node,
   wherein said RSSI values are processed into signal strength amplitudes and optimized, comprising the following steps:
      converting the signal strength values RSSI into signal amplitudes according to:

$$A_i = k * (10^{RSSI_i})^{0.5}$$

wherein $A_i$ is a signal amplitude, k is a constant coefficient, i is a channel label, and
   $RSSI_i$ is a measured signal strength value of the $i^{th}$ channel;
      calculating the central values $A_0$ of the signal amplitudes $A_i$ repeatedly and converting $A_0$ into an optimized RSSI value; and
      calculating the distance value between the target node and the respective anchor node according to the optimized RSSI value, wherein the central value $A_0$ of said signal amplitude is calculated by, at least one of:
   i. solving for $A_0$ according to $$A_0 = A_1 l \sqrt{1 + \frac{l^2}{l^2+(2h)^2} + 2\frac{l}{\sqrt{l^2+(2h)^2}} \cos\left(\frac{2\pi\left(\sqrt{l^2+(2h)^2}-l\right)}{\lambda}\right)},$$

wherein l is the distance between the positioning anchor node and the target node, h is the height from the respective anchor node to the ground, and $\lambda$ is the wavelength of a radio frequency signal; or
   ii. solving for an approximate value of $A_0$ according to $$A_0 = \frac{A_{max}+A_{min}}{2},$$

wherein the maximum $A_{max}$ and the minimum $A_{min}$ are values of the signal amplitude $A_i$.

2. The RSSI positioning method based on frequency-hopping spread spectrum technology according to claim 1, wherein said RSSI ranging model is a constant-logarithm model, according to:

$$A = RSSI(d) + 10*n*\lg(d)$$

wherein, A is signal received power at a distance of 1m, n is a propagation factor, d is a distance between the target node and the respective anchor node, and A and n are ranging parameters.

3. The RSSI positioning method based on frequency-hopping spread spectrum technology according to claim 2, wherein the ranging parameters in said RSSI ranging model are determined through repeated multi-channel communication experiments, comprising the following steps:
   calculating the measured values of A and n by measuring RSSI values of two sets of different d position; and
   averaging the obtained A and n as the values A and n by repeated multi-channel communication measurements.

4. The RSSI positioning method based on frequency-hopping spread spectrum technology according to claim 1, wherein said wireless sensor network is a multi-channel TDMA mesh network with time synchronization, and comprising anchor nodes, target nodes, the positioning server, and a network path auxiliary device.

5. The RSSI positioning method based on frequency-hopping spread spectrum technology according to claim 1, wherein the central value $A_0$ of said signal amplitude is calculated by solving for an approximate value of $A_0$ according to $$A_0 = \frac{A_{max}+A_{min}}{2}.$$

6. The RSSI positioning method based on frequency-hopping spread spectrum technology according to claim 1, wherein said optimized RSSI value is calculated by using the central value $A_0$ of the signal amplitude, specifically:

$$RSSI = 2*\log_{10}(A/k)$$

wherein k is a constant coefficient.

7. An RSSI positioning method based on frequency-hopping spread spectrum technology, comprising:

measuring RSSI values of a plurality of channels at fixed points, and recording and calculating at least one ranging parameter in an RSSI ranging model;

deploying a wireless sensor network and synchronizing between a target node and a plurality of anchor nodes in the wireless sensor network;

communicating with the plurality of anchor nodes, via the target node, by respectively utilizing a plurality of channels, thereby obtaining the RSSI values; the plurality of anchor nodes eliminating the channels with relatively large RSSI value error from a frequency-hopping spread spectrum (FHSS) sequence according to the received position signal strength of the sending node in one FHSS cycle; and updating the FHSS sequence and adding the eliminated channels to a blacklist;

processing the RSSI values into signal strength amplitudes and performing optimization; and calculating a distance value between the target node and each anchor node in the plurality of anchor nodes on a positioning server according to each of the signal strength amplitudes, and calculating the position coordinate of the target node, wherein a distance value between the target node and each anchor node in the plurality of anchor nodes is calculated based on substituting the central value $A_0$ of the signal amplitude into the formula $$d = 10^{\left(\frac{A-RSSI(d)}{10n}\right)}$$

to calculate a distance value d for each respective anchor node.

8. An RSSI positioning method based on frequency-hopping spread spectrum technology, comprising measuring RSSI values of a plurality of channels at fixed points, and recording and calculating at least one ranging parameter in an RSSI ranging model;

deploying a wireless sensor network and synchronizing between a target node and a plurality of anchor nodes in the wireless sensor network;

communicating with the plurality of anchor nodes, via the target node, by respectively utilizing a plurality of channels, thereby obtaining the RSSI values; the plurality of anchor nodes eliminating the channels with relatively large RSSI value error from a frequency-hopping spread spectrum (FHSS) sequence according to the received position signal strength of the sending node in one FHSS cycle; and updating the FHSS sequence and adding the eliminated channels to a blacklist;

processing the RSSI values into signal strength amplitudes and performing optimization; and calculating a distance value between the target node and each anchor node of the plurality of anchor nodes on a positioning server according to each of the signal strength amplitudes, and calculating the position coordinate of the target node, wherein the calculation of said position coordinate of the target node on the positioning server according to each of the signal strength and the distance value comprises:

calculating, for each anchor node of the plurality of anchor nodes, a distance value d between the respective anchor node and the target node; drawing, for each anchor node of the plurality of anchor nodes, a square using 2d as a width and using the respective anchor node as a central point;

wherein the coordinate of a first anchor node of the plurality of anchor nodes $(x_a, y_a)$; the RSSI value received by the first anchor node is used for calculating the estimated distance $d_a$ between the first anchor node and the target node; a square is drawn around the first anchor node by using $2*d_a$ as a side length and using $(x_a, y_a)$ as the center, such that the coordinates of four vertices of the square around the first anchor node are:

$(x_a-d_a, y_a-d_a) \times (x_a+d_a, y_a+d_a)$ wherein the coordinates of the further anchor nodes of the plurality of anchor nodes are expressed as $(x_i, y_i)$, with i representing the $i^{th}$ anchor node of the plurality of anchor nodes; the RSSI values received by the further anchor nodes are used for calculating respective estimated distances $d_i$ between the respective anchor nodes and the target node; and a respective square is drawn around each of the further anchor nodes by using, for each respective square, $2*d_i$ as a side length and $(x_i, y_i)$ as a center, such that the respective coordinates of the vertices of the further anchor nodes are:

$(x-d_i, y_i-d_i) \times (x_i+d_i, y_i+d_i)$ wherein the target node is determined to be within an overlapping region of the drawn squares of the respective anchor nodes, the coordinates of four vertices of the overlapping region being:

$[\max(x_i-d_i), \max(y_i-d_i)] \times [\min(x_i-d_i), \min(y_i-d_i)]$; and wherein the position coordinate of the target node is calculated as the central position of the overlapping region, with the coordinate as:

$[(\max(x_i-d_i)+\min(x_i+d_i))/2, (\max(y_i-d_i)+\min(y_i+d_i))/2]$.

9. The RSSI positioning method based on frequency-hopping spread spectrum technology according to claim 1, wherein the central value $A_0$ of said signal amplitude is calculated by solving for $A_0$ according to $$A_0 = A_i \Big/ \sqrt{1 + \frac{l^2}{l^2+(2h)^2} + 2\frac{l}{\sqrt{l^2+(2h)^2}}\cos\left(\frac{2\pi\left(\sqrt{l^2+(2h)^2}-l\right)}{\lambda}\right)}.$$

* * * * *